United States Patent
Sah

(10) Patent No.: US 12,476,920 B2
(45) Date of Patent: Nov. 18, 2025

(54) NETWORK CONGESTION DETECTION AND MITIGATION

(71) Applicant: Yokogawa Electric Corporation, Tokyo (JP)

(72) Inventor: Ratnesh Sah, Bedok (SG)

(73) Assignee: Yokogawa Electric Corporation, Tokyo (JP)

( * ) Notice: Subject to any disclaimer, the term of this patent is extended or adjusted under 35 U.S.C. 154(b) by 250 days.

(21) Appl. No.: 18/207,756

(22) Filed: Jun. 9, 2023

(65) Prior Publication Data

US 2024/0414093 A1    Dec. 12, 2024

(51) Int. Cl.
| | |
|---|---|
| *H04L 47/34* | (2022.01) |
| *H04L 43/0829* | (2022.01) |
| *H04L 43/0864* | (2022.01) |
| *H04L 43/0882* | (2022.01) |
| *H04W 24/08* | (2009.01) |
| *H04W 28/02* | (2009.01) |

(52) U.S. Cl.
CPC .......... *H04L 47/34* (2013.01); *H04L 43/0841* (2013.01); *H04L 43/0864* (2013.01); *H04L 43/0882* (2013.01); *H04W 24/08* (2013.01); *H04W 28/0236* (2013.01)

(58) Field of Classification Search
CPC . H04L 47/34; H04L 43/0841; H04L 43/0864; H04L 43/0882; H04L 47/283; H04W 24/08; H04W 28/0236
See application file for complete search history.

(56) References Cited

U.S. PATENT DOCUMENTS

| | | | |
|---|---|---|---|
| 6,269,080 B1 | 7/2001 | Kumar | |
| 10,917,352 B1* | 2/2021 | Hanes | H04L 69/16 |
| 2018/0307045 A1 | 10/2018 | Nishi | |
| 2020/0276703 A1 | 9/2020 | Chebotar et al. | |
| 2020/0404536 A1* | 12/2020 | Han | H04W 24/08 |

FOREIGN PATENT DOCUMENTS

| | | |
|---|---|---|
| CN | 107395325 | 11/2017 |
| CN | 107566275 | 1/2018 |
| CN | 112165355 | 1/2021 |
| EP | 3696733 | 8/2020 |

* cited by examiner

*Primary Examiner* — Christopher M Brandt
(74) *Attorney, Agent, or Firm* — Sheridan Ross PC

(57) ABSTRACT

Network congestion occurs when the volume of data to be sent from one node to another, in a given time, exceeds the network's capacity. While all networks are susceptible to congestion, a wireless network of vehicles/moving vehicles are particularly sensitive as any delays in offloading acquired data may cause the vehicles/moving vehicles to pause operations (e.g., hover or land and later return to a location) while waiting to send data. By monitoring data buffer size and/or other system attributes, a measure of how successful data transmission is a corresponding degree of network congestion. When network congestion is present congestion mitigating actions are taken.

20 Claims, 8 Drawing Sheets

NETWORK CONGESTION DETECTION AND MITIGATION

FIELD OF THE DISCLOSURE

The invention relates generally to systems and methods for data transmission and particularly to detecting and mitigating network congestion.

BACKGROUND

Data transmission and reception limitations are often resolved by adding or upgrading hardware to handle additional capacity. However, changing hardware is not always an option. Real-time systems, such as those operating a remote vehicle (e.g., a vehicle/moving vehicle for air), are particularly sensitive to any communication delays. Vehicles/moving vehicles may comprise vehicles for land, water and air. Delays may be caused by data congestion when additional network nodes (e.g., other vehicles/moving vehicles) are similarly trying to send or receive data. The congestion may result in latency, dropped packets, or other issues. For example, a vehicle/moving vehicle operating under remote control requires sufficient bandwidth to receive operational inputs. Vehicles/moving vehicles for air in particular, are optimized to reduce size, weight, and power consumption in order to maximize the mission duration. As a result, adding higher-bandwidth transmitters or additional buffering memory adds to the weight and power demands.

A vehicle/moving vehicle performing a remote sensing operation, such as with high-definition cameras or other sensing equipment, may need to offload data as quickly as possible, especially when the data gathered is used for subsequent control inputs. If a vehicle/moving vehicle has to pause operations (e.g., hover) to allow for additional time to transmit or retransmit data due to network congestion, the mission duration or operational ability of the vehicle/moving vehicle may be adversely impacted. Effectively mitigating network congestion allows vehicles/moving vehicles or other networked nodes to improve data throughput without requiring hardware modifications.

SUMMARY

Networks come in a variety of topologies and methodologies. Networks may be hardwired, wireless, or a combination thereof. A network may be ad hoc and provided for a limited purpose. For example, a plurality of vehicles/moving vehicles may be tasked with capturing imaging data of a power transmission equipment, pipeline, railroad, etc. to determine if any faults or other issues are present. The vehicles/moving vehicles comprise sensing equipment to capture images or data. Sensing equipment may capture images in one or more bands of the electromagnetic spectrum and/or other detectable attribute (e.g., chemical, radiation, etc.) in conjunction with the location of the vehicle/moving vehicle corresponding to the sensing activity or when a particular image or data was captured. Sensing equipment may be passive, such as a camera, or active, such as Lidar. Additional, different, or alternative sensing or imaging may be utilized without departing from the scope of the embodiments described herein.

The vehicles/moving vehicles are often deployed as nodes on a wireless network used to communicate with a base station. The base station may itself be a node on the network and relay data to other nodes on the same or different network (e.g., cellular network, satellite, other base stations, etc.). Additionally or alternatively, the base stations may provide data storage and/or data processing services. Vehicle/moving vehicle operations are inherently time sensitive due to the limited flight time but additional urgency may exist, such as to quickly identify the location of a pipeline leak or arcing transmission line. Deploying a plurality of vehicles/moving vehicles in an area allows for faster coverage of a given area or subject but may overload the network resulting in the vehicles/moving vehicles being unable to quickly offload captured data.

These and other needs are addressed by the various embodiments and configurations of the present invention. The present invention can provide a number of advantages depending on the particular configuration. These and other advantages will be apparent from the disclosure of the invention(s) contained herein.

In one embodiment, an accurate determination of network congestion is provided and, when present, responses to the network congestion are automatically applied.

Embodiments of congestion detection include monitoring a data buffer of one or more nodes on the network. Data captured by the sensing equipment is written to the data buffer and sent by the transmission components of the node (e.g., a vehicle/moving vehicle). Data may be captured in large blocks, such as snapshots of Lidar images, packetized, and transmitted. Upon transmission of a packet, the node waits to receive an acknowledgement message (e.g., ACK) indicating the receiving node has successfully received the packet. The acknowledgement message tends to have dynamic behavior, which needs to be completed/handled within a time duration (e.g. 100 milliseconds), so as to avoid/reduce congestion or latency. In response to the acknowledgement, the portion of the data buffer used to hold the packet is marked as available for other purposes (e.g., empty), such as to receive a subsequent packet for transmission. If the acknowledgment comes late than a predetermined duration, or not at all, such as due to network congestion, the size of the unsent data in the data buffer grows. The vehicle/moving vehicle may lose data or need to suspend acquiring more data if the unsent data grows too large. While the size of the data in the data buffer (buffer length) will vary, a threshold value for the size may be determined and, if exceeded, indicate a network congestion issue which may trigger congestion mitigation. Buffer length is calculated periodically at a predetermined time interval, wherein the predetermined time interval is determined based on the timestamp of the current packet and two associated packets of the current packet and their respective timestamps. The two associated packets refer to a packet zoom-in from the current packet, and a packet zoom-out from the current packet.

In another embodiment, each of the plurality of nodes has a unique transmission time as an offset from a reference time. For example, one node may transmit at zero seconds past the reference time, another node transmits at three seconds past the reference time, etc. The separation between times, such as three seconds in the preceding example, may be statically or dynamically determined. If one node takes more than three seconds to complete its transmission of data, the subsequent node may encounter congestion, which may be observed from an absence of a timely acknowledgement message. Such an insufficient separation may cascade through the remaining nodes, and the problem may be exacerbated by the nodes attempting to resend packets for which they have not yet received an acknowledgement message.

In another embodiment, network congestion may be mitigated or eliminated by signaling the nodes to change their offset from the reference time. In the above example, if each node required three and a half seconds to transmit their data, each node having a transmission offset of three seconds may result in network congestion as nodes simultaneously send, and resend, data packets. However, incrementing the offset to increments of four seconds may remedy the issue as each node now has less competition for a block of time in which the network is, partially or entirely, allocated for use by single node. For example, if two or more nodes are able to transmit data packets and, in response, receive a timely acknowledgement message, then network congestion is not present and the nodes may continue to have overlapping transmission times and/or additional nodes may have overlapping transmission times. Additionally or alternatively, each node may be signaled to suspend transmission if transmission extends beyond the time in which the next node would begin transmission. As a result, a node may be unable to send all data in the data buffer during a single transmission session and the unsent data may grow in the data buffer and require further/alternative mitigation.

In another embodiment, nodes may report attributes of their data buffer (e.g., current utilization rate, high value over a time period, time spent over a threshold during a time period, variation, etc.). Reporting may be performed automatically, such as periodically or upon an event (e.g., data buffer utilization reaching a reporting threshold that is at or below a congestion threshold) or in response to being polled, such as by a peer node or base station. For example, buffer length is calculated periodically at a predetermined time interval, so as to provide details of congestion as how much packets of Lidar snapshots of images are in queue, and make the data transmission/transfer in an effective manner.

In another embodiment, network congestion may be determined by delays experienced by nodes in transmitting data. For example, a node may hold a subsequent packet while waiting to receive an acknowledgement message for a previous packet. Channel load, the amount of data conveyed versus the amount of data that a given network is capable of conveying, such as due to the network utilizing a particular band(s) of radio frequencies, packet format, utilizing transmission/reception equipment with a fixed baud rate, etc. and/or lost packets may similarly be examined to determine whether a network is experiencing congestion. While a congested network may operate normally (e.g., all nodes are able to send data packets and receive acknowledge messages in an acceptable time frame), is may indicate that communication problems are either present, but not yet reported, or are likely to occur.

In another embodiment, round trip time (RTT) is used to determine if packets are "strong" or "weak." RTT is known in the art as the time duration for a data packet to be sent and a corresponding acknowledgement to be received by the sender. If no acknowledgement is received, the packet may be determined as "fail." When all or a previously determined number or ratio of the packets sent receive a timely acknowledgement message, the packets are "strong." Conversely, if none (or a below threshold number or ratio) of packets receive a timely acknowledgement message, the packets are "weak." If the packets are "strong" then a more efficient means of conveying the acknowledgement messages may be implemented. For example, an early basis may be utilized wherein an acknowledgement for a preceding packet is sent during transmission of a subsequent packet (e.g., piggybacking). If the packets are "weak" then piggybacking is discontinued wherein acknowledgement messages are sent as separate data packets. Additionally or alternatively, data packets are transmitted to a plurality of other nodes. If the transmitting device receives timely acknowledgement messages from each of the other nodes, the data packets are "strong." If the acknowledgment messages are not timely received, the data packets are "weak." If one or more expected acknowledgment messages are never received, the data packets are "fail."

Round trip time (RTT) is the time duration a data packet is sent and an acknowledgement received by the sender. Smoothed round trip time (SRTT) is a known formula wherein sudden spikes in RTT have a lesser effect on RTT. SRTT may then produce a time value that is utilized for setting a retransmission time for a packet that has not yet received an acknowledgement message.

The Smoothed round trip time (SRTT) will be used to generate packet sequence number, message number, timestamp, destination socket ID or data with controlled information field, which will be used to regulate/facilitate the re-transmission. For example, a packet will be provided with packet sequence number, which indicates the transmission order/sequence. Once packet sequence number is calculated, packets was re-ordered and sent in micro batches from a sender to a receiver. At the receiver the packets will be arranged based on encrypted sequence number of file.

In one embodiment, a system is disclosed, comprising:

A method of sequencing data packets, comprising: sending a data packet, via a network, to each of a plurality of nodes; receiving, in response to the sent data packet, a set of acknowledgement data packets; upon determining that a level of network congestion of the network is above a previously determined threshold, further determining whether the set of acknowledgement data packets is greater than zero but less than the number of the plurality of nodes and, when true, determining a retransmission time to retransmit the data packet, wherein the retransmission time is determined by smoothing the durations between the time the data packet was sent and the times each of the set of acknowledgement data packets is received; and after waiting the retransmission time, retransmitting the data packet.

A method of transmitting data, comprising: receiving a plurality of data packets from a network of the plurality of data packets originating from a plurality of wireless devices; determining, from an attribute of the plurality of data packets, that network congestion is greater than a threshold congestion level and, when true, calculating a plurality of round trip times (RTT) corresponding to each of the plurality of data packets; determining, from the RTT, a second parameter of the plurality of data packets comprising a time before receiving at least one of a plurality of acknowledgement data packets; determining that the second parameter exceeds a previously determined threshold and, when true, calculating a third parameter as a result of a smoothing operation on the second parameter; and determining, from the third parameter, a delay before retransmitting the data packets; and upon the occurrence of the delay, causing at least one of the plurality of wireless devices to retransmit a corresponding one of the plurality of data packets.

A system, comprising: a transmitter-receiver to transmit and receive data on at least one radio frequency; and a processor coupled with a computer memory, comprising computer-readable instructions to cause the processor to: generate a data packet; cause the transmitter-receiver to transmit the data packet to each of a plurality of nodes; receive, in response to the sent data packet, a set of acknowledgement data packets; determine a level of congestion on the at least one radio frequency; upon determining the level of congestion is greater than a previously determined threshold, further determine whether the set of acknowledgement data packets is greater than zero but less than the number of the plurality of nodes and, when true, determine a retransmission time to retransmit the data packet, wherein the retransmission time is determined by smoothing the durations between the time the data packet was sent and the times each of the set of acknowledgement data packets is received; and after waiting the retransmission time, cause the transmitter-receiver to retransmit the data packet.

Exemplary aspects are directed to:

Upon determining that the level of network congestion of the network is above the previously determined threshold, further determining whether the set of acknowledgement data packets is zero and, when true, setting the retransmission time to zero;

Upon determining that the level of network congestion of the network is above the previously determined threshold, further determining whether the set of acknowledgement data packets is the same as the size of the plurality of nodes, omitting retransmitting the data packet;

Wherein determining the level of network congestion further comprises determining network congestion from an amount of free capacity available in a buffer holding data to be sent to the plurality of nodes.

Wherein determining the level of network congestion further comprises determining a number of packets lost between a set of data packets previously sent to the plurality of nodes and having received no corresponding acknowledgement data packet.

Wherein determining the level of network congestion further comprises determining a utilization rate for a communication frequency utilized by the network for at least one of transmitting the set of data packets to the plurality of nodes or receiving the acknowledgment data packets.

Wherein determining the level of network congestion further comprises determining an amount of variation in at least one of: an amount of free capacity available in a buffer holding data to be sent to the plurality of nodes, a number of packets lost between a set of data packets previously sent to the plurality of nodes and having received no corresponding acknowledgement data packet, or a utilization rate for a communication frequency utilized by the network for at least one of transmitting the set of data packets to the plurality of nodes or receiving the acknowledgment data packets.

Wherein: the data packet is categorized as strong, upon determining that the number of the set of acknowledgement data packets equals the number of the plurality of nodes; the data packet is categorized as weak, upon determining that the number of the set of acknowledgement data packets is less than the number of the plurality of nodes but greater than zero; and the data packet is categorized as failed, upon determining that the number of the set of acknowledgement data packets is zero;

Wherein the network comprises a wireless network.

Wherein the third parameter comprises a buffer size of a buffer of data waiting to be transmitted.

Wherein determining, from the attribute of the plurality of data packets, further comprising determining at least one of channel load, delay, and packet loss.

Wherein the third parameter comprises a buffer size, wherein the buffer size is automatically adjusted to be smaller when the network is congested.

Wherein the delay is increased in accordance with an increase in variation of the second parameter.

Wherein the delay is increased in accordance with an increase in fluctuation of the second parameter.

Wherein the processor, upon determining that the level of network congestion of the network is above the previously determined threshold, further comprises determining whether the set of acknowledgement data packets is zero and, when true, setting the retransmission time to zero.

Wherein the processor, upon determining that the level of network congestion of the network is above the previously determined threshold, further comprises determining whether the set of acknowledgement data packets is the same as the size of the plurality of nodes, omitting retransmitting the data packet.

Wherein the processor determines the level of network congestion further comprising determining network congestion from an amount of free capacity available in a buffer holding data to be sent to the plurality of nodes.

Wherein the processor determines the level of network congestion further comprising determining a number of packets lost between a set of data packets previously sent to the plurality of nodes and having received no corresponding acknowledgement data packet.

A system on a chip (SoC) including any one or more of the above aspects of the embodiments described herein.

One or more means for performing any one or more of the above aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112 (f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
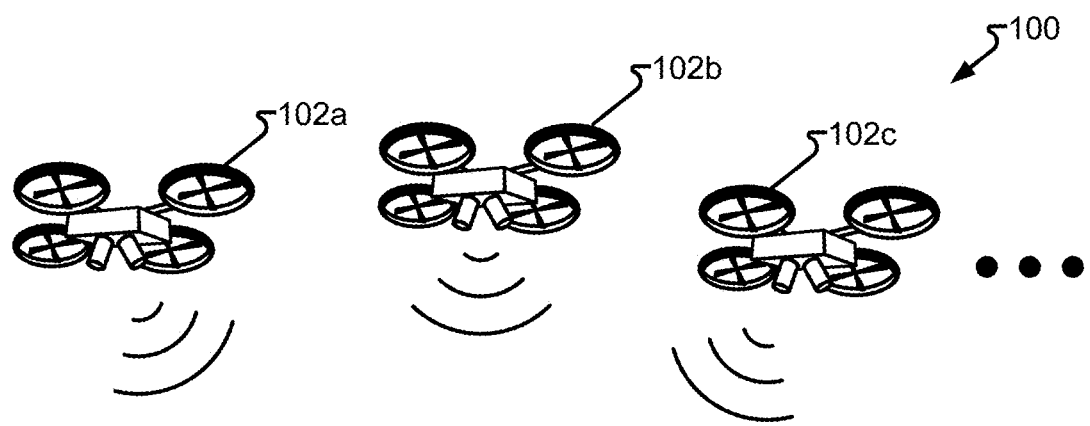
FIG. 1 depicts a system in accordance with embodiments of the present disclosure.
Figure 1:
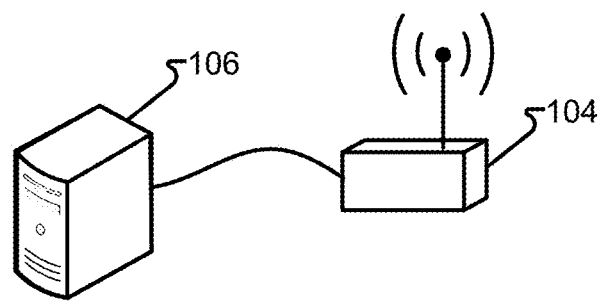

FIG. 1 depicts system 100 in accordance with embodiments of the present disclosure. In one embodiment, a wireless network is formed comprising a plurality of vehicles/moving vehicles, namely vehicles/moving vehicles 102a-102c and base station 104. Base station 104 may comprise or utilize server 106, such as to store and/or process data received by vehicles/moving vehicles 102. Each of vehicles/moving vehicles 102a-102c and base station 104 comprise wireless networking components thereby forming a wireless network therebetween.

While embodiments herein are described as utilizing vehicles/moving vehicles 102a-102c (e.g., vehicles for air, vehicles for land), it should be appreciated that vehicles/moving vehicles are one embodiment and that other wireless devices may be utilized. Additionally, the number of nodes on the network comprise at least two nodes (e.g., at least two of vehicles/moving vehicles 102a-102c) communicating with a third node (e.g., base station 104). While vehicles/moving vehicles 102a-102c are in two-way communication with base station 104, the bulk of the data originates from vehicles/moving vehicles 102a-102c, such as from data sensing equipment thereon (e.g., camera, Lidar, etc.). As a result, one or more of vehicles/moving vehicles 102a-102c may be unable to successfully transmit their data to base station 104, wherein data is successfully transmitted when, after sending the data (e.g., a data packet) a timely acknowledgement message is received in response. If the acknowledgement message is not received, or only received after an excessive delay, the transmission is unsuccessful. Acknowledgement messages inherently arrive with some delay. A determination that the delay is excessive, therefore serves as one means to determine that network congestion is present. Other determinations of network congestion include a determination of the utilization of a data buffer of any of one or more vehicles/moving vehicles 102a-102c, wherein the data buffer is used to hold untransmitted or unsuccessfully transmitted data. If utilization is over a previously determined threshold, the amount of unsent (unsuccessfully sent) data is excessive and, therefore, an indicator of network congestion. Other means of determining network congestion, and mitigations, are provided herein.

Figure 2:
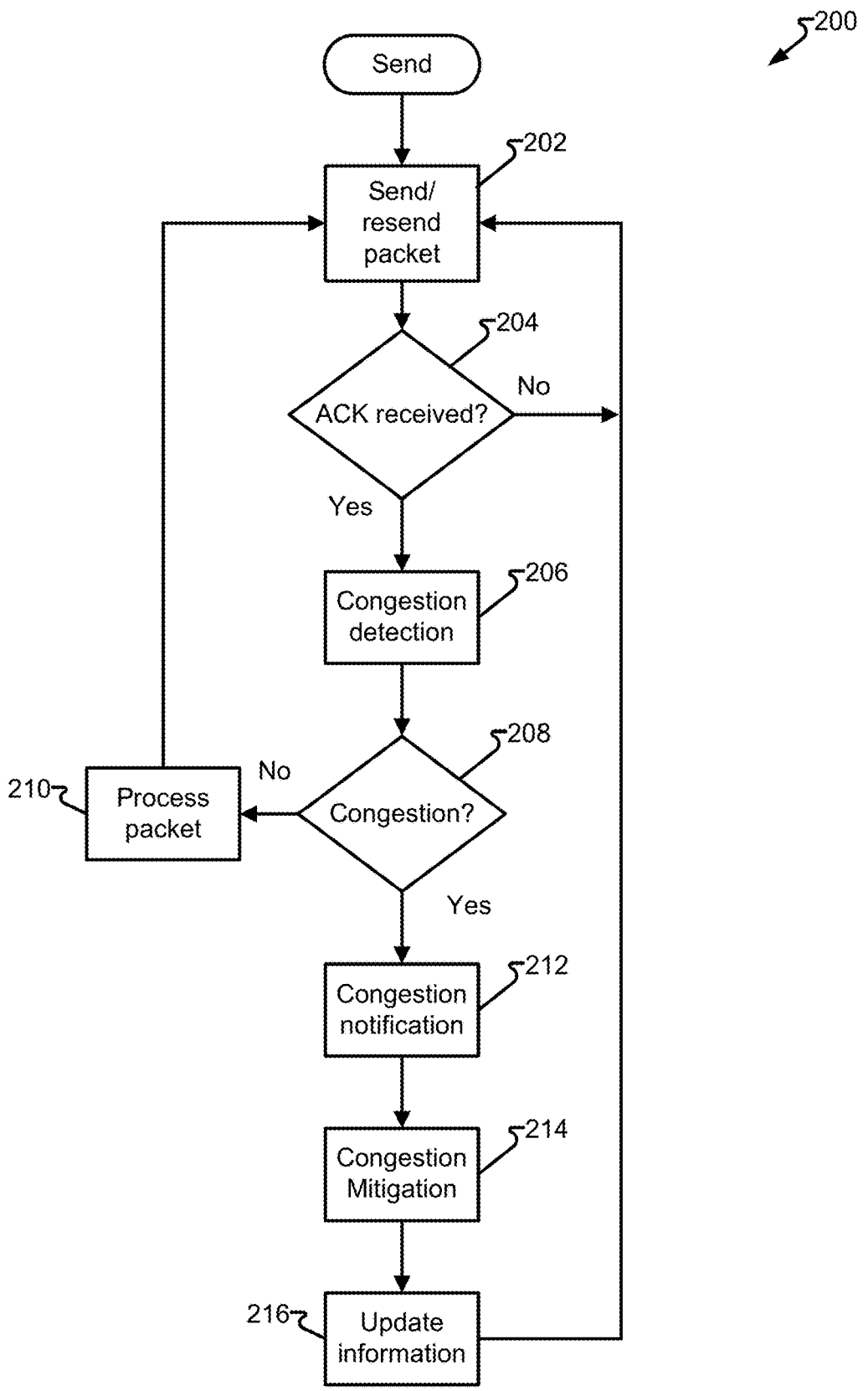
FIG. 2 depicts a process in accordance with embodiments of the present disclosure.

FIG. 2 depicts process 200 in accordance with embodiments of the present disclosure. In one embodiment, process 200 is embodied as machine-readable instructions maintained in a non-transitory memory that when read by a machine, such as processors of a server, cause the machine to execute the instructions and thereby execute process 200. The processor of the server may include, but is not limited to, at least one processor of server 106 and/or one or more of vehicles/moving vehicles 102a-102c.

Process 200 begins and, in step 202, a data packet is sent to a receiver, such as one of vehicles/moving vehicles 102a-102c transmitting a data packet to base station 104. In response, step 204 determines whether a corresponding acknowledgement message (e.g., "ACK") as been received. If step 204 is determined in the negative, processing loops back to step 202 to retransmit the data packet. A retransmission timeout (RTO) value determines how long retransmission (i.e., step 202 and step 204) will be attempted before concluding the packet is undeliverable, which may then terminate process 200. Otherwise, step 204 is, or will be, determined in the affirmative and processing continues to step 206.

Step 206 executes congestion detection logic. Congestion detection logic is variously embodied, as described herein, such as to determine if the data buffer holding data to be sent by a node (e.g., one or more of vehicles/moving vehicles 102a-102c) is above a previously determined threshold. Additionally or alternatively, congestion detection may be, or include, determining if the number of re-transmission attempts is above a previously determined threshold, determining if scheduling (e.g., due to a transmission time offset from a reference time being increased or increased above a previously determined threshold), and/or other indicators of network congestion.

Step 208 then makes a yes/no decision from step 206 whether or not the network is experiencing congestion. If no, step 210 processes the packet, such as by server 106 storing the packet, analyzing the packet, and/or forwarding the packet to a relay or other server for subsequent storage and/or processing. Step 210 may further provide feedback to the mission for one or more of vehicles/moving vehicles 102a-102c. For example, vehicles/moving vehicles 102a-102c may be examining a high-voltage electrical transmission line, and server 106, upon receiving a particular thermal image from one of vehicles/moving vehicles 102a-102c discovers a hot spot (e.g., a region of the transmission line that is arcing). As a result, server 106 may cause the same and/or other of vehicles/moving vehicles 102a-102c to add additional tasks to their mission, such as obtaining additional images of the area showing the hot spot. For example, one of vehicles/moving vehicles 102a-102c may capture a thermal image showing the hot spot and, after receiving the thermal image, server 106 may task another vehicle/moving vehicle of vehicles/moving vehicles 102a-102c, such as one with a high-resolution video-camera, to capture visual images of the area, such as to determine the extent of the damage to the line or supporting structures.

If step 208 is determined in the affirmative, then one or more congestion mitigation actions may be taken. For example, step 212 performs congestion notification tasks, such as to inform one or more nodes of the existence of the congestion and, in step 214, takes one or more mitigating actions. For example, step 214 may cause one or more of vehicles/moving vehicles 102a-102c to alter the offset from a reference time to transmit, shorten their transmission time, and/or other action as described herein. Step 216 may then update information such as the status of the node (e.g., vehicles/moving vehicles 102a-102c and/or base station 104) to other nodes to indicate actions taken.

Figure 3:
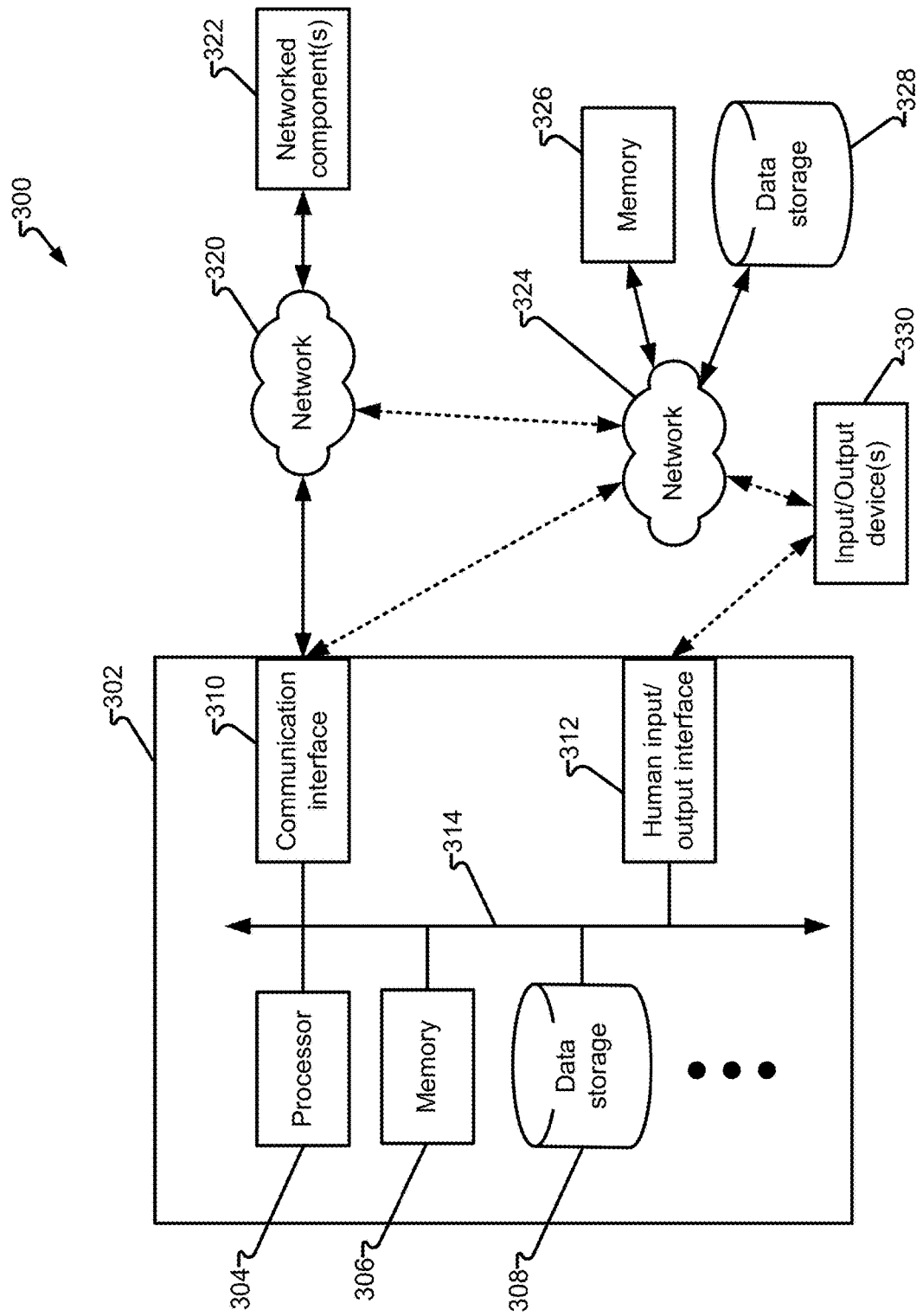
FIG. 3 depicts a system in accordance with embodiments of the present disclosure.

FIG. 3 depicts device 302 in system 300 in accordance with embodiments of the present disclosure. In one embodiment, base station 104 and each of vehicles/moving vehicles 102a-102c may be embodied, in whole or in part, as device 302 comprising various components and connections to other components and/or systems. The components are variously embodied and may comprise processor 304. The term "processor," as used herein, refers exclusively to electronic hardware components comprising electrical circuitry with connections (e.g., pin-outs) to convey encoded electrical signals to and from the electrical circuitry. Processor 304 may comprise programmable logic functionality, such as determined, at least in part, from accessing machine-readable instructions maintained in a non-transitory data storage, which may be embodied as circuitry, on-chip read-only memory, computer memory 306, data storage 308, etc., that cause the processor 304 to perform the steps of the instructions. Processor 304 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 314, executes instructions, and outputs data, again such as via bus 314. In other embodiments, processor 304 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 304 is a non-transitory computing device (e.g., electronic machine comprising circuitry and connections to communicate with other components and devices). Processor 304 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 304). Processor 304 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 304, device 302 may utilize computer memory 306 and/or data storage 308 for the storage of accessible data, such as instructions, values, etc. Communication interface 310 facilitates communication with components, such as processor 304 via bus 314 with components not accessible via bus 314. Communication interface 310 may be embodied as a network port, card, cable, or other configured hardware device. Additionally or alternatively, human input/output interface 312 connects to one or more interface components to receive and/or present information (e.g., instructions, data, values, etc.) to and/or from a human and/or electronic device. Examples of input/output devices 330 that may be connected to input/output interface include, but are not limited to, keyboard, mouse, trackball, printers, displays, sensor, switch, relay, speaker, microphone, still and/or video camera, etc. In another embodiment, communication interface 310 may comprise, or be comprised by, human input/output interface 312. Communication interface 310 may be configured to communicate directly with a networked component or configured to utilize one or more networks, such as network 320 and/or network 324.

Network 320 may be a wired network (e.g., Ethernet), wireless (e.g., WiFi, Bluetooth, cellular, etc.) network, or combination thereof and enable device 302 to communicate with networked component(s) 322. In other embodiments, network 320 may be embodied, in whole or in part, as a telephony network (e.g., public switched telephone network (PSTN), private branch exchange (PBX), cellular telephony network, etc.).

Additionally or alternatively, one or more other networks may be utilized. For example, network 324 may represent a second network, which may facilitate communication with components utilized by device 302. For example, network 324 may be an internal network to a business entity or other organization, whereby components are trusted (or at least more so) than networked components 322, which may be connected to network 320 comprising a public network (e.g., Internet) that may not be as trusted.

Components attached to network 324 may include computer memory 326, data storage 328, input/output device(s) 330, and/or other components that may be accessible to processor 304. For example, computer memory 326 and/or data storage 328 may supplement or supplant computer memory 306 and/or data storage 308 entirely or for a particular task or purpose. As another example, computer memory 326 and/or data storage 328 may be an external data repository (e.g., server farm, array, lake, "cloud," etc.) and enable device 302, and/or other devices, to access data thereon. Similarly, input/output device(s) 330 may be accessed by processor 304 via human input/output interface 312 and/or via communication interface 310 either directly, via network 324, via network 320 alone (not shown), or via networks 324 and 320. Each of computer memory 306, data storage 308, computer memory 326, data storage 328 comprise a non-transitory data storage comprising a data storage device.

It should be appreciated that computer-readable data may be sent, received, stored, processed, and presented by a variety of components. It should also be appreciated that components illustrated may control other components, whether illustrated herein or otherwise. For example, one input/output device 330 may be a router, a switch, a port, or other communication component such that a particular output of processor 304 enables (or disables) input/output device 330, which may be associated with network 320 and/or network 324, to allow (or disallow) communications between two or more nodes on network 320 and/or network 324. One of ordinary skill in the art will appreciate that other communication equipment may be utilized, in addition or as an alternative, to those described herein without departing from the scope of the embodiments.

Figure 4:
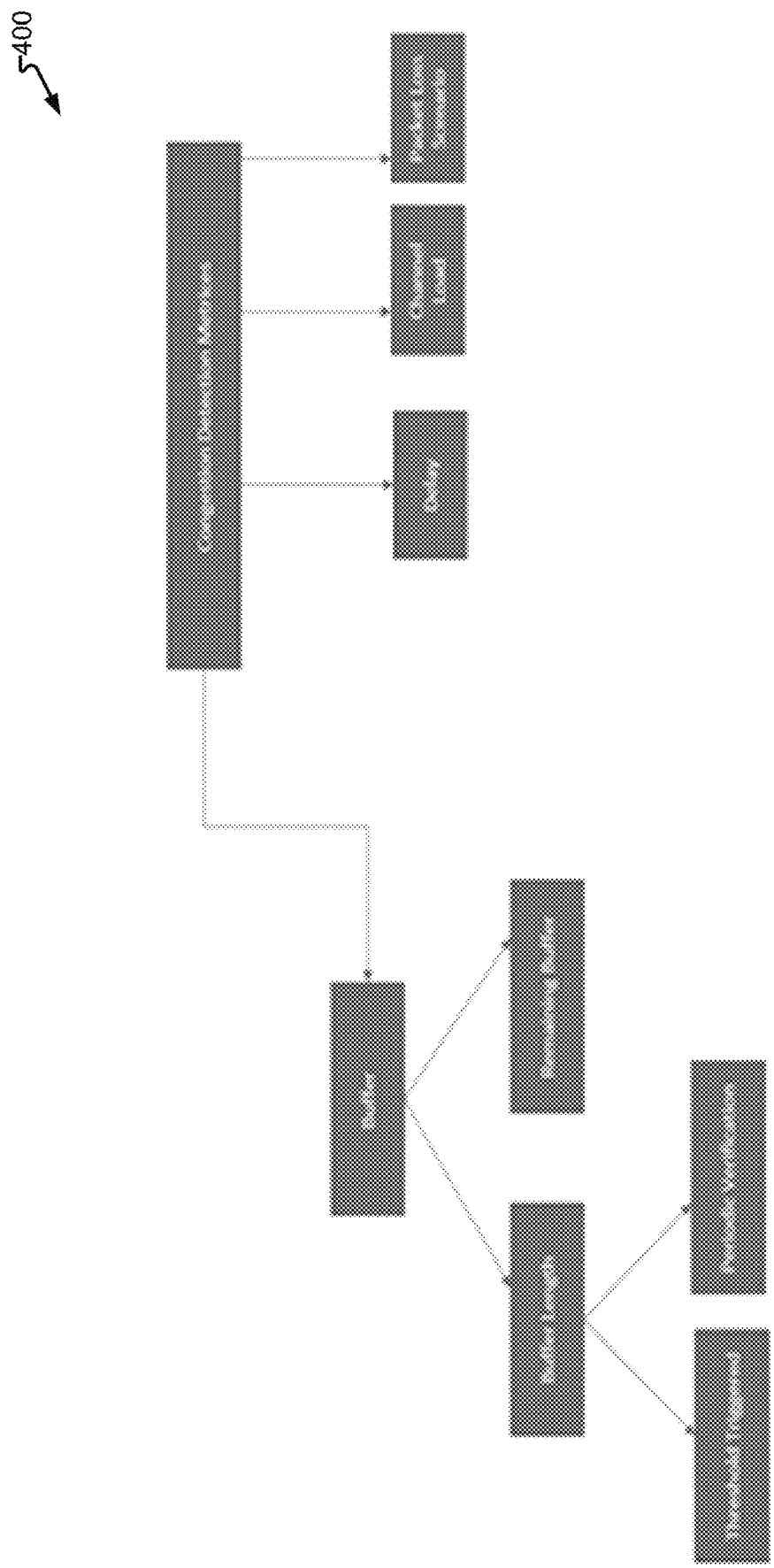
FIG. 4 depicts a workflow in accordance with embodiments of the present disclosure.

FIG. 4 depicts workflow 400 in accordance with embodiments of the present disclosure.

Figures 5, 6:
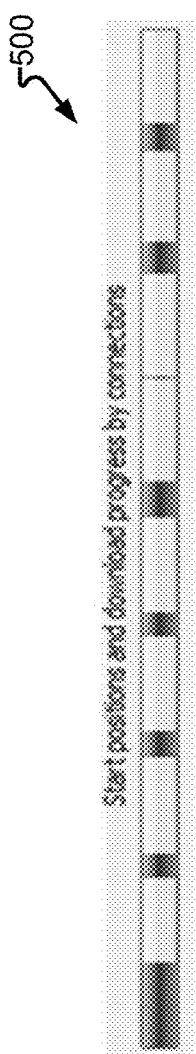
FIG. 5 depicts download starting positions in accordance with embodiments of the present disclosure.
FIG. 6 depicts a download progress in accordance with embodiments of the present disclosure.

FIG. 5 depicts download starting positions 500 in accordance with embodiments of the present disclosure.

FIG. 6 depicts download progress 600 in accordance with embodiments of the present disclosure.

Figure 7:
FIG. 7 depicts a download bit rate and offset in accordance with embodiments of the present disclosure.

FIG. 7 depicts a user interface 700 showing download bit rate and offset and the octet rule in accordance with embodiments of the present disclosure. In particular, FIG. 7 illustrates a user interface 700 that enables monitoring of network congestion and that further enables a user to adjust the latency and/or video frames per second (FPS). For instance, if the latency is observed to be above 2 seconds, then the user may be allowed to adjust the FPS/RTO via the user interface 700.

Figure 8:
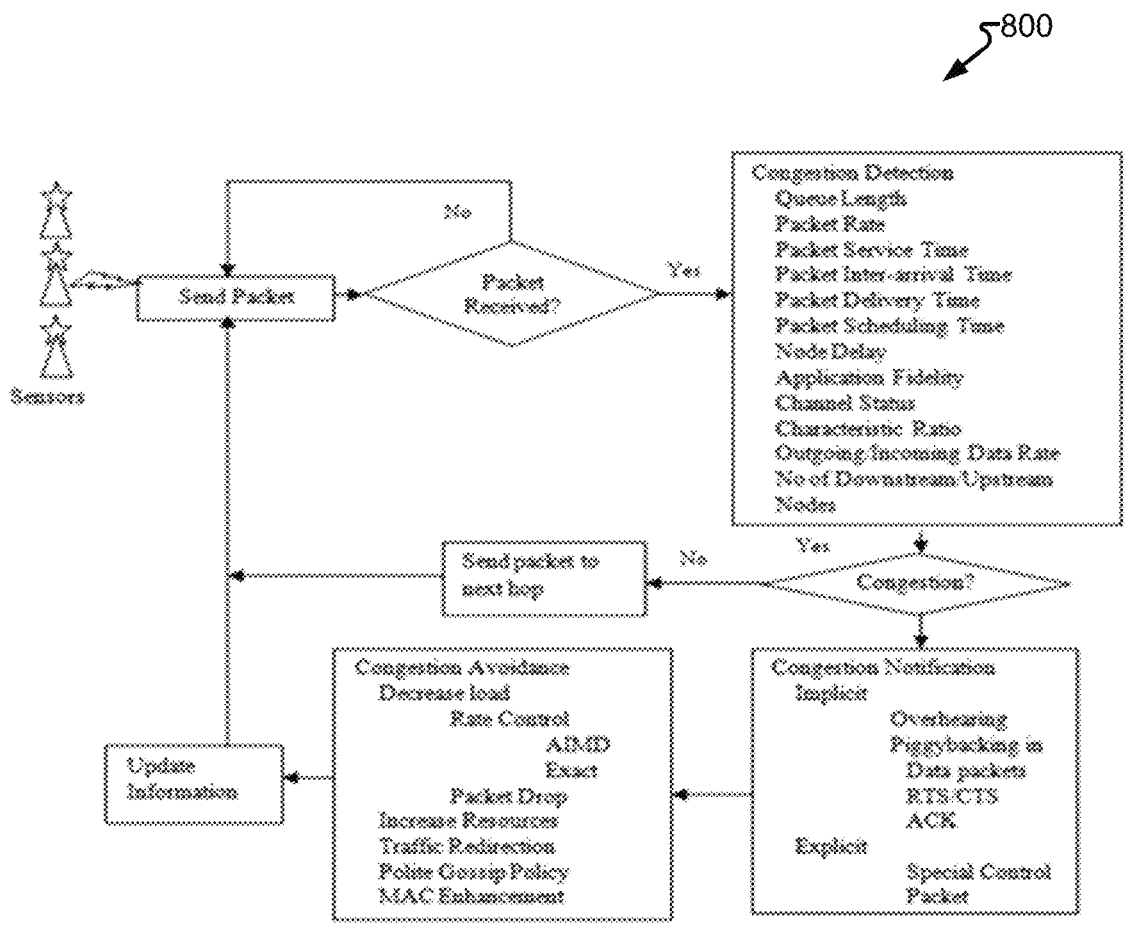
FIG. 8 depicts a workflow in accordance with embodiments of the present disclosure.

FIG. 8 depicts data packet refactoring workflow 800 in accordance with embodiments of the present disclosure. As can be appreciated, congestion can occur in networks when multiple nodes try to transmit data. In some embodiments, the nodes closer to the sender are more prone to congestion, as they generally carry large upstream traffic. Congestion leads to higher packet loss, increase packet delay, less energy efficiency, and poor throughput. The workflow 800 illustrated in FIG. 8 will help to send data in chunks to reduce the data dependency on one node with the refactoring sequences.

The workflow 800 may include a packet sending step, a packet receiving step, and then a congestion detection step.

In the congestion detection step, a number of parameters of the packet may be analyzed to determine if congestion exists. Non-limiting examples of parameters that may be analyzed include queue length, packet rate, packet service time, packet inter-arrival time, packet delivery time, node delay, application fidelity, channel status, characteristic ratio, outgoing/incoming data rate, and number of downstream/upstream nodes.

If congestion is detected in the congestion detection step, the workflow 800 may continue with a congestion notification step. The notification step may include providing implicit notifications and/or explicit notifications. The workflow 800 may further include a congestion control/avoidance step to help decrease load. Load may be decreased by implementing rate control, packet drops, increasing resources, redirecting traffic, providing a polit gossip policy, and/or MAC enhancement.

The workflow 800 may then include an information update. Following the information update or if no congestion was detected, then the workflow 800 may return to the packet sending step.

Figure 9:
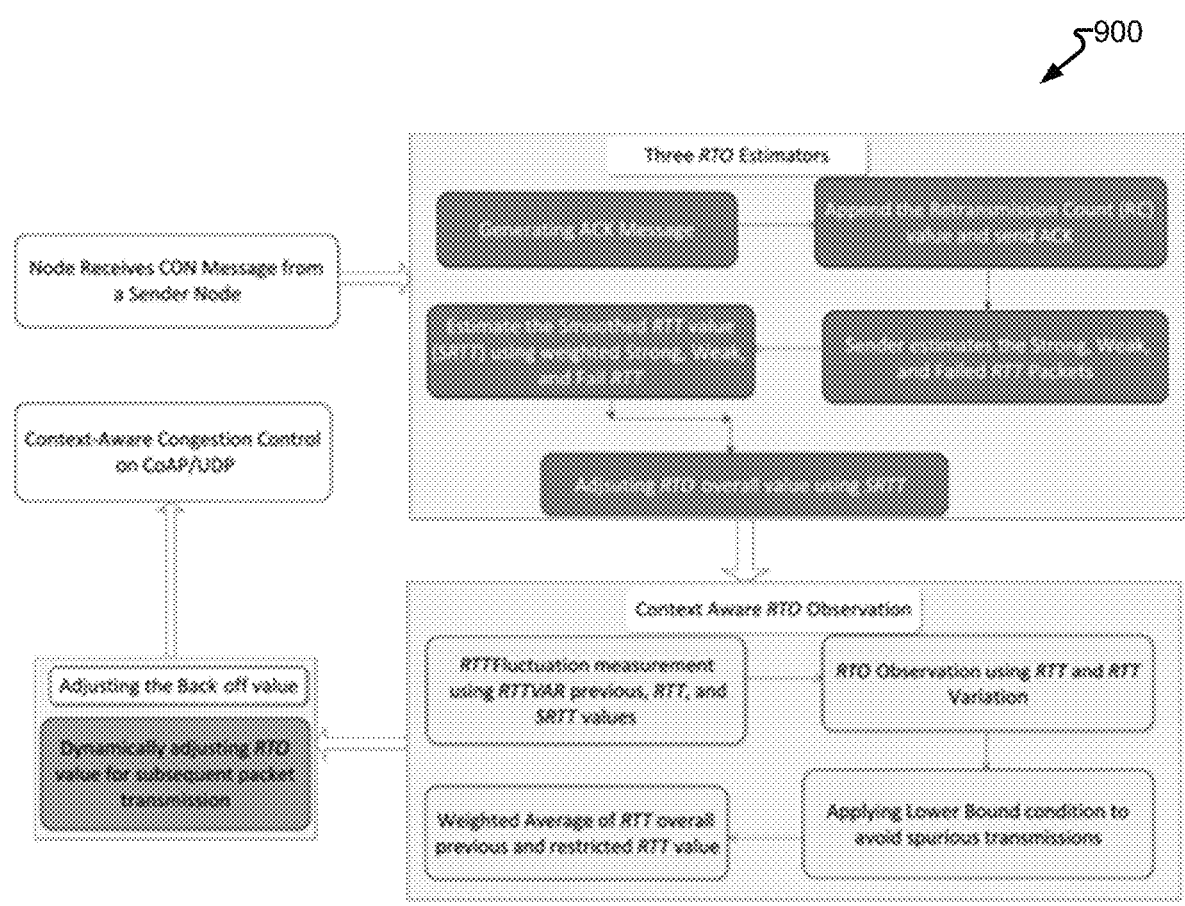
FIG. 9 depicts a congestion data refactoring workflow for latency in accordance with embodiments of the present disclosure.

FIG. 9 depicts congestion data refactoring workflow for latency 900 in accordance with embodiments of the present disclosure. Constrained application protocol (CoAP) is a standard communication protocol that favors lightweight interoperability for accommodating resource-constrained devices. CoAP specification congestion control is insensitive to various network conditions. Thus, differentiating the scenario of packet loss due to bit error rate and congestion, and identifying correct round-trip time (RTT) of retransmitted message-acknowledgement is quite helpful to adapt the CoAP behavior based on the network status. As an example, RTT calculation/estimation can provide a context aware RTO observation, which can then provide a context aware congestion control (CACC) approach.

In the workflow for latency 900, a CACC approach for lightweight CoAP/user datagram protocol-based IoT traffic is illustrated. The CACC proposes mechanisms that include retransmission timeout (RTO) estimators. Illustratively, and without limitation, RTO estimators may include retransmission count-based smoothed round-trip-time observation, lower bound RTO restriction approach, and aging concepts (e.g., where aging refers to how much time the packet is working (being processed and transmitted) in the workflow). RTO estimators may utilize strong, weak, and failed RTT to identify exact network status and to provide adaptive congestion control.

The workflow for latency 900 may further include context aware RTO observations. In particular, the CACC may incorporate the variable of retransmission count in request-response interaction model to mitigate the negative variation in RTT due to the fluctuation in the IoT environment. RTO observation using RTT and RTT variations, which can mitigate the negative variation in RTT, due to the RTT fluctuation in the IoT environment. A lower bound RTO restriction approach may also be applied where unnecessary spurious retransmissions are avoided, and the aging mechanism limits the validity of the RTO value to improve the efficiency. Such an approach may reduce the latency, which is described herein. The context aware RTO observation may also include determining how many bits can be transferred or processed within a certain amount of time (weighted average of RTT/bitrate). In some embodiments, the weighted average of RTT/bitrate will be determined based on previous RTT (e.g., a RTT value, before the system condition changed from static to motion or vice versa), and also based on restricted RTT (a threshold RTT value, that the system can transfer data within this threshold).

Consider the following example of weighted average of RTT overall previous and restricted RTT values. Weighted average of RTT overall is the packet of data which is related to bitrate. Bitrate refers to how many bits can be transferred or processed within a certain amount of time. Bitrate is usually measured in a number of bits per second. If the system is in standstill condition it will send the data with small data sizes (e.g., 256 kb). Conversely, if the system is in motion, then the data will be sent at larger sizes (e.g., up to 10 Mb size). Thus, if the system is in motion, the workflow 900 checks what is the threshold value of node and transmissions beyond the threshold value will be treated as restricted RTT.

Previous RTT means, for example, if the system condition changed from static to motion, there is change in the data transmission. The first packets which are sent after this change will be sent using the entire workflow that the RTT packets used in the initial state. Then, when the state is changed, the, is changed from 10 mb and it will provide an acknowledgment.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method of sequencing data packets, comprising:
    sending a data packet, via a network, to each of a plurality of nodes;
    receiving, in response to the sent data packet, a set of acknowledgement data packets;
    upon determining that a level of network congestion of the network is above a previously determined threshold, further determining whether the set of acknowledgement data packets is greater than zero but less than a number of the plurality of nodes and, when true, determining a retransmission time to retransmit the data packet, wherein the retransmission time is determined by smoothing the durations between the time the data packet was sent and the time each of the set of acknowledgement data packets is received; and after waiting the retransmission time, retransmitting the data packet.

2. The method of claim 1, further comprising, upon determining that the level of network congestion of the network is above the previously determined threshold, further determining whether the set of acknowledgement data packets is zero and, when true, setting the retransmission time to zero.

3. The method of claim 1, further comprising, upon determining that the level of network congestion of the network is above the previously determined threshold, further determining whether the set of acknowledgement data packets is the same as the size of the plurality of nodes, omitting retransmitting the data packet.

4. The method of claim 1, wherein determining the level of network congestion further comprises determining network congestion from an amount of free capacity available in a buffer holding data to be sent to the plurality of nodes.

5. The method of claim 1, wherein determining the level of network congestion further comprises determining a number of packets lost between a set of data packets previously sent to the plurality of nodes and having received no corresponding acknowledgement data packet.

6. The method of claim 1, wherein determining the level of network congestion further comprises determining a utilization rate for a communication frequency utilized by the network for at least one of transmitting the set of data packets to the plurality of nodes or receiving the acknowledgement data packets.

7. The method of claim 1, wherein determining the level of network congestion further comprises determining an amount of variation in at least one of: an amount of free capacity available in a buffer holding data to be sent to the plurality of nodes, a number of packets lost between a set of data packets previously sent to the plurality of nodes and having received no corresponding acknowledgement data packet, or a utilization rate for a communication frequency utilized by the network for at least one of transmitting the set of data packets to the plurality of nodes or receiving the acknowledgement data packets.

8. The method of claim 1, wherein:
the data packet is categorized as strong, upon determining that the number of the set of acknowledgement data packets equals the number of the plurality of nodes;
the data packet is categorized as weak, upon determining that the number of the set of acknowledgement data packets is less than the number of the plurality of nodes but greater than zero; and
the data packet is categorized as failed, upon determining that the number of the set of acknowledgement data packets is zero.

9. The method of claim 1, wherein the network comprises a wireless network.

10. A method of transmitting data, comprising:
receiving a plurality of data packets from a network of the plurality of data packets originating from a plurality of wireless devices;
determining, from an attribute of the plurality of data packets, that network congestion is greater than a threshold congestion level and, when true, calculating a plurality of round trip times (RTT) corresponding to each of the plurality of data packets;
determining, from the RTT, a second parameter of the plurality of data packets comprising a time before receiving at least one of a plurality of acknowledgement data packets;
determining that the second parameter exceeds a previously determined threshold and, when true, calculating a third parameter as a result of a smoothing operation on the second parameter;
determining, from the third parameter, a delay before retransmitting the data packets; and
upon the occurrence of the delay, causing at least one of the plurality of wireless devices to retransmit a corresponding one of the plurality of data packets.

11. The method of claim 10, wherein the third parameter comprises a buffer size of a buffer of data waiting to be transmitted.

12. The method of claim 10, wherein determining, from the attribute of the plurality of data packets, that network congestion is greater than the threshold congestion level further comprises determining at least one of channel load, delay, and packet loss is greater than the threshold congestion level.

13. The method of claim 10, wherein the third parameter comprises a buffer size, wherein the buffer size is automatically adjusted to be smaller when the network is congested.

14. The method of claim 10, wherein the delay is increased in accordance with an increase in variation of the second parameter.

15. The method of claim 10, wherein the delay is increased in accordance with an increase in fluctuation of the second parameter.

16. A system, comprising:
a transmitter-receiver to transmit and receive data on at least one radio frequency and thereby for a network; and
a processor coupled with a computer memory, comprising computer-readable instructions to cause the processor to:
generate a data packet;
cause the transmitter-receiver to transmit the data packet to each of a plurality of nodes;
receive, in response to the sent data packet, a set of acknowledgement data packets;
determine a level of network congestion on the at least one radio frequency;
upon determining the level of network congestion is greater than a previously determined threshold, further determine whether the set of acknowledgement data packets is greater than zero but less than the number of the plurality of nodes and, when true, determine a retransmission time to retransmit the data packet, wherein the retransmission time is determined by smoothing the durations between the time the data packet was sent and the time each of the set of acknowledgement data packets is received; and
after waiting the retransmission time, cause the transmitter-receiver to retransmit the data packet.

17. The system of claim 16, wherein the processor, upon determining that the level of network congestion of the network is above the previously determined threshold, further comprises determining whether the set of acknowledgement data packets is zero and, when true, setting the retransmission time to zero.

18. The system of claim 16, wherein the processor, upon determining that the level of network congestion of the network is above the previously determined threshold, further comprises determining whether the set of acknowledgement data packets is the same as the number of the plurality of nodes, omitting retransmitting the data packet.

19. The system of claim 16, wherein the processor determines the level of network congestion further comprising determining the level of network congestion from an amount of free capacity available in a buffer holding data to be sent to the plurality of nodes.

20. The system of claim 16, wherein the processor determines the level of network congestion further comprising determining the level of network congestion from a number of packets lost between a set of data packets previously sent to the plurality of nodes and without receiving a corresponding acknowledgement data packet.

* * * * *